US010096190B2

(12) United States Patent
Yamine

(10) Patent No.: US 10,096,190 B2
(45) Date of Patent: Oct. 9, 2018

(54) SYSTEM AND METHOD FOR PRIORITY ACTUATION

(71) Applicant: Badawi Yamine, Hazmieh (LB)

(72) Inventor: Badawi Yamine, Hazmieh (LB)

( * ) Notice: Subject to any disclaimer, the term of this patent is extended or adjusted under 35 U.S.C. 154(b) by 0 days.

(21) Appl. No.: 15/391,657

(22) Filed: Dec. 27, 2016

(65) Prior Publication Data

US 2018/0182199 A1 Jun. 28, 2018

(51) Int. Cl.

| | |
|---|---|
| ***G05B 19/00*** | (2006.01) |
| ***G07C 9/00*** | (2006.01) |
| ***B66B 1/46*** | (2006.01) |

(52) U.S. Cl.

CPC .......... *G07C 9/00896* (2013.01); *B66B 1/468* (2013.01); *G07C 9/00111* (2013.01); *B66B 2201/4653* (2013.01); *B66B 2201/4676* (2013.01); *G07C 2209/02* (2013.01)

(58) Field of Classification Search

CPC ............ G07C 9/00896; G07C 9/00111; G07C 2209/02; B66B 1/468; B66B 2201/4676; B66B 2201/4653

USPC ......... 340/5.6, 5.2, 12.22, 572.1; 455/404.1; 726/7, 17

See application file for complete search history.

(56) References Cited

U.S. PATENT DOCUMENTS

| | | | | |
|---|---|---|---|---|
| 7,461,723 | B2 | 12/2008 | Kawai | |
| 8,251,185 | B2 | 8/2012 | Manabe | |
| 8,839,914 | B2 * | 9/2014 | Iwata | B66B 5/021 187/384 |
| 2008/0010674 | A1 * | 1/2008 | Lee | G06F 21/32 726/7 |

* cited by examiner

*Primary Examiner* — Dhaval Patel

(74) *Attorney, Agent, or Firm* — Ariel S. Bentolila; Bay Area IP Group, LLC

(57) ABSTRACT

A system and method for priority actuation is provided. The system and method comprise a priority button. An access to the priority button is provided to an authorized user. The authorized user is enabled to initiate a priority actuation trigger for a priority service in the at least one automated access system using the priority button. The automated access system is operably coupled to at least one server via a communication gateway. The server comprises a database of all authorized users of a priority service. Triggering the priority button results in initiating the priority actuation trigger for sending an authentication information of the authorized user to the server. The server authenticates the user as the authorized user enabled to access the priority service; and provides the user with the priority service for the at least one automated access system.

18 Claims, 5 Drawing Sheets

SYSTEM AND METHOD FOR PRIORITY ACTUATION

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relates to a priority actuation system. More particularly, certain embodiments of the invention relate to priority actuation triggers.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is contemplated that many buildings may typically include elevators and many passengers may use the elevators each day. Some conventional elevators may include doors which may automatically open when passenger may approach the elevator doors. Some other conventional elevators may allow passengers to designate a destination floor before entering the elevator. It is further contemplated that with most conventional elevators, passengers may need to stop at each floor that may be designated by current and/or potential passengers. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that some conventional elevators may include a button that may prevent the elevator doors from opening. In some hospitals, elevators may include priority functionalities where a patient may be taken, in an emergency situation, from one floor to another floor by passing some intervening stops. Some other conventional elevators may include automated priority systems which may detect a disaster event and automatically operate the elevator to travel to a predesignated floor for evacuation or refuge. In yet some other conventional elevator systems, identification information of known and regular passengers may be locally stored and used to provide specialized access to the passengers in a single building, wherein the identification information may be locally stored with respect to the single building.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
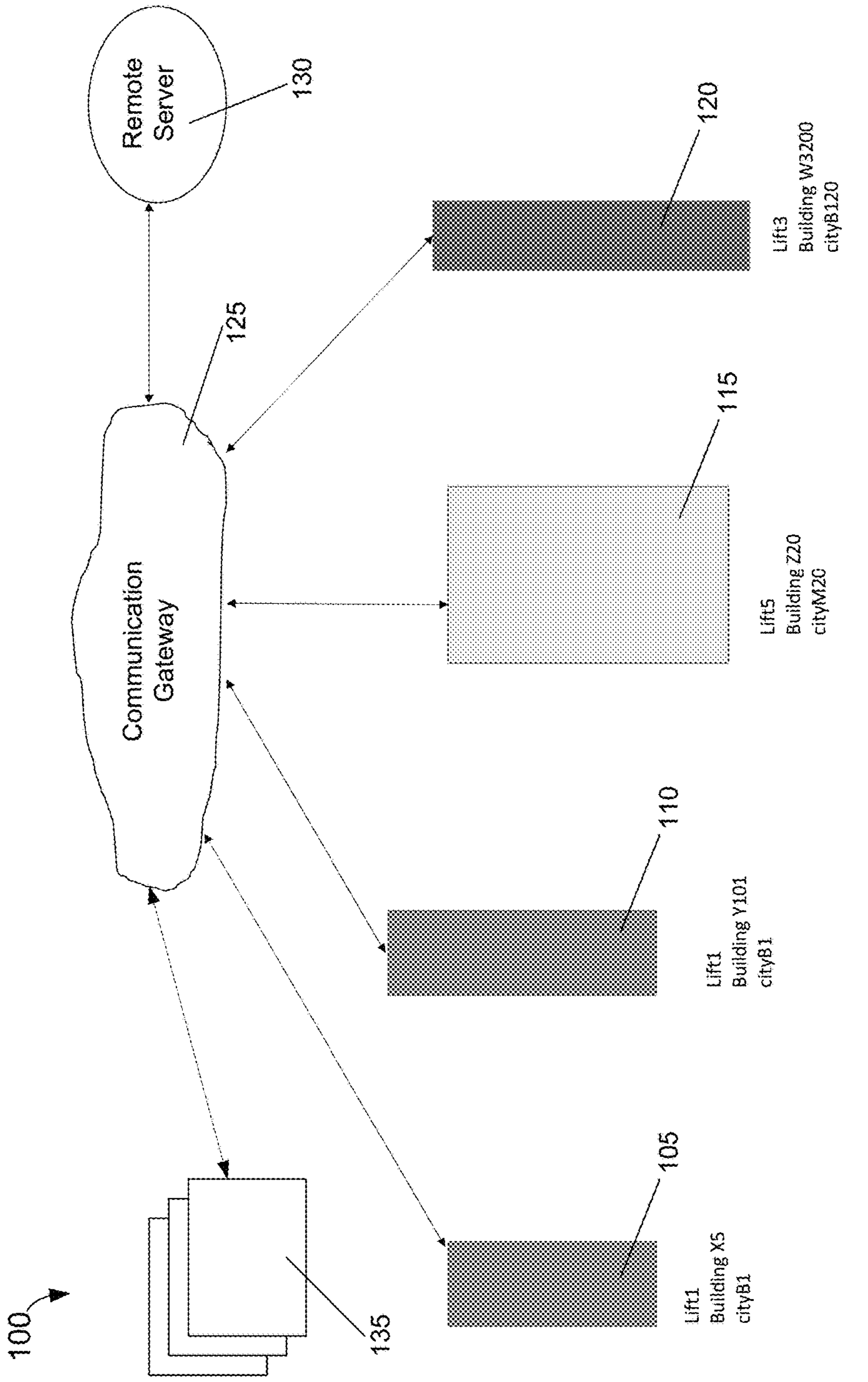
FIG. 1 illustrates an exemplary priority actuation system architecture, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms “a,” “an,” and “the” include the plural reference unless the context clearly dictates otherwise. Thus, for example, a reference to “an element” is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc As will be established in some detail below, it is well settle law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.,* 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.,* 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.,* 347 F.3d 1314, 1322 (Fed. Cir. 2003); *Epcon Gas Sys., Inc.* v. *Bauer Compressors, Inc.,* 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.,* 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon,* 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.,* 279 F.3d 1022 (Fed. Cir. 2002) (construing the terms "substantially constant" and "substantially below"); *Zodiac Pool Care, Inc.* v. *Hoffinger Indus., Inc.,* 206 F.3d 1408 (Fed. Cir. 2000) (construing the term "substantially inward"); *York Prods., Inc.* v. *Cent. Tractor Farm & Family Ctr.,* 99 F.3d 1568 (Fed. Cir. 1996) (construing the term "substantially the entire height thereof"); *Tex. Instruments Inc.* v. *Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek,* 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.,* 66 F.3d 1211, 1217, 36 USPQ2d 1225, 1229 (Fed. Cir. 1995); see, e.g., *Andrew Corp.* v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, *In re Hutchison*, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.,* 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.).

Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

It is contemplated that there may be many situations wherein a user of lifts or other automated access systems may desire to have priority access and/or control of the lifts and/or other automated access systems, wherein the lifts or other automated access systems may be, for example, and without limitation, elevators, dumbwaiters, service elevators, traffic lights, escalators, moving walkways, controlled access turnstiles, controlled access doors, or any combination thereof. In many conventional elevator systems a prioritized floor designation may not be controlled by the passenger but rather controlled by a programmed evacuation algorithm. By way of example, and without limitation, in some cases, security and/or law enforcement personnel may desire to utilize substantially any lifts and/or other automated access systems for express travel in response to an emergency situation such as, and without limitation, in pursuit of a suspect, a fire, a flood, other natural disasters. In some other cases, healthcare personnel may desire to utilize substantially any lifts and/or other automated access systems for express travel when transporting passengers to healthcare facilities and/or within healthcare facilities. In yet some other cases, residents and/or non-residents may desire to utilize substantially any lifts and/or other automated access systems for express travel located in a multiplicity of locations and in a multiplicity of buildings.

In some embodiments of the present invention, a user may utilize a priority actuation system to call and/or gain priority access to a lift, wherein the priority actuation system may include at least downloadable and executable computer-readable instructions on a mobile device which may be in operable communication with the lift.

In some embodiments of the present invention, a user may utilize a priority actuation trigger to operate an automated access system such as, and without limitation, to call and/or gain priority access to a lift, to alter a direction of an escalator and/or moving walkway, to change a color of a traffic light, to open a controlled access door and/or turnstile, and/or to operate other computer controlled systems that may be configured to be in operable communication with the priority actuation trigger.

In some embodiments of the present invention, a user may utilize a priority actuation system to call and/or gain access to a lift, wherein the priority actuation system may be in operable communication with one or more biometric sensors. The one or more biometric sensors may be configured to detect biometric data of the user, wherein the lift may be called in response to the detected biometric data.

In some embodiments of the present invention, a priority actuation system may include a priority actuation trigger, wherein the priority actuation trigger may actuate the priority actuation system in response to receiving identity information and a password from a user.

As will be described in some detail below with reference to the figures, in many embodiments of the present invention, an exemplary priority actuation system may be actuated by an exemplary priority actuation trigger, wherein the priority actuation trigger may be, for example and without limitation, an executable software application button, a physical hardware button, a proximity detection of a wireless signal, a biometric signal detection or any combination thereof. Furthermore, in many embodiments of the present invention, the priority actuation system may include automated access systems, such as, and without limitation, lifts, elevators, dumbwaiters, service elevators, traffic lights, escalators, moving walkways, controlled access turnstiles, controlled access doors, or any combination thereof, wherein the automated access systems may be in operable communication with one or more remote servers to receive and/or send executable computer readable instructions. Moreover, in many embodiments of the present invention, the exemplary priority action trigger may also be in operable communication with one or more automated access systems and the one or more remote servers.

FIG. 1 illustrates an exemplary priority actuation system architecture 100, in accordance with an embodiment of the present invention. In the present embodiment, by way of example, and without limitation, the exemplary priority actuation system may include a multiplicity of automated access systems, a sampling denoted as lift 105, lift 110, lift 115, and lift 120, wherein the multiplicity of automated access systems may be, for example, and without limitation, lifts located in a multiplicity of buildings respectively. In the present embodiment, the exemplary priority actuation system may also include a communication gateway 125 operably coupled to the multiplicity of automated access systems, wherein the communication gateway may include, for example, and without limitation, IP connection over Ethernet cable, IP connection over a wireless connection (Wi-Fi or 2G, 3G, 4G, 5G or the like), fiber optic communication, Bluetooth, RFID, ZigBee, local area networks (LANs), wide area networks (WANs), wired telephone networks, cellular telephone networks, or substantially any other network supporting data communication between respective entities via hardwired or wireless communication networks. In the present embodiment, the multiplicity of automated access systems may be operably coupled to a remote server 130 via the communication gateway, wherein the communication gateway may provide a two way secure communication link between each of the multiplicity of automated access systems, the remote server, and a multiplicity of user mobile computing devices, sampled here as user mobile computing device 135. In the present embodiment, the remote server may include a database storage unit configured to store data related to a multiplicity of users and the multiplicity of automated access systems in a city, a country, or substantially any other designated region suitable for the needs of a particular application, wherein data related to a multiplicity of users may include one or more user data sets of user identification information and one or more passwords associated with each user. The remote server may further include a processor which may process data for operations related to the multiplicity of automated access systems. Each of the multiplicity of automated access systems may also include a local processing control unit respectively, wherein each local processing control unit may include a local database and server for storing data and executing computer readable instructions related to automated access system operations. Furthermore, each of the multiplicity of automated access systems may include a unique identifier. In some embodiments, by way of example, and without limitation, the unique identifiers may be based on a combination of an automated access system number (which may vary from 1 up to the total number of automated travel systems in a particular location), a building name, and/or a city name.

Figure 2:
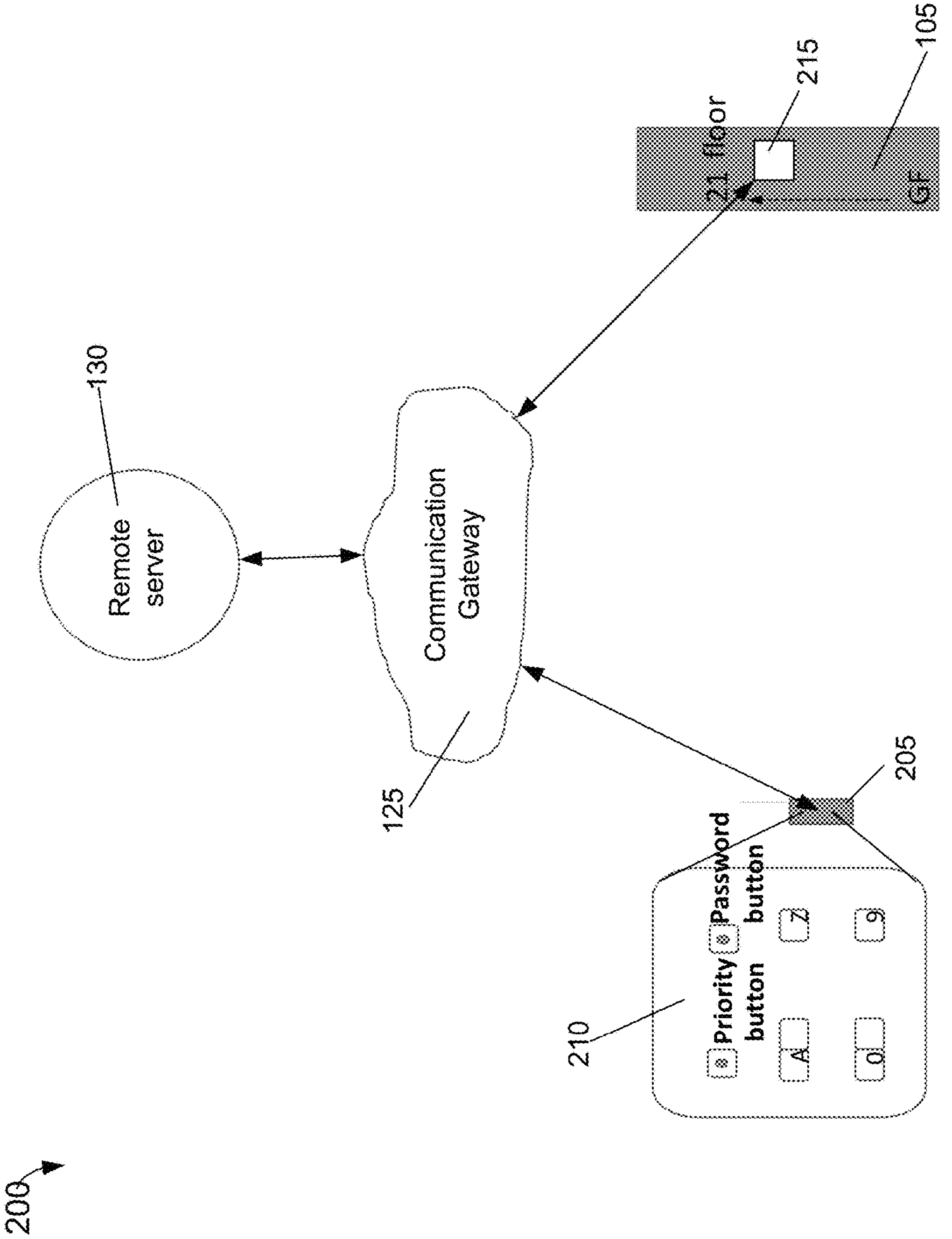
FIG. 2 illustrates an another exemplary priority actuation system architecture, in accordance with an embodiment of the present invention.

In many embodiments of the present invention, a priority actuation system may include a priority actuation software application, wherein the priority actuation software application may be, for example, and without limitation, downloaded from the remote server to a mobile computing device such as, and without limitation, a mobile phone, a tablet, laptop, and/or wirelessly enabled wearable devices, via the communication gateway connection. The priority actuation software application may be executed by processors of the mobile computing device and interacted with by a user via a user interface of the mobile computing device. FIG. 2 illustrates an exemplary priority actuation system architecture 200, in accordance with an embodiment of the present invention. In the present embodiment, and with reference to FIG. 1, the exemplary priority actuation system may include a mobile computing device 205, a user interface 210 of the mobile computing device, one or more automated access systems, sampled as lift 105, a local processing control unit 215 of the lift, a communication gateway 125, and a remote server 130. In the present embodiment, the user interface may include a keyboard with alphanumeric keys that may allow a user to remotely call one or more automated access systems for particular operations such as, for example, and without limitation, one or more lifts for travel to destination floors, one or more traffic lights for light switching, one or more moving walkway for moving direction change, one or more escalator for moving direction change, one or more controlled access turnstiles for access entry and/or access denial, one or more controlled access doors for opening/closing, or substantially any combination thereof. The user interface may further include a password button and additional alphanumeric keys that may allow a user to choose a password option and enter a password. In many embodiments of the present invention, one or more automated access systems may be configured to be operably coupled to the priority actuation software application via the communication gateway and operable communication of the processing control unit being operably coupled to each automated access system respectively, wherein the local processing control unit may execute computer readable instructions to receive incoming calls and actuate the respective operably coupled automated access system to perform designated tasks.

Figure 3:
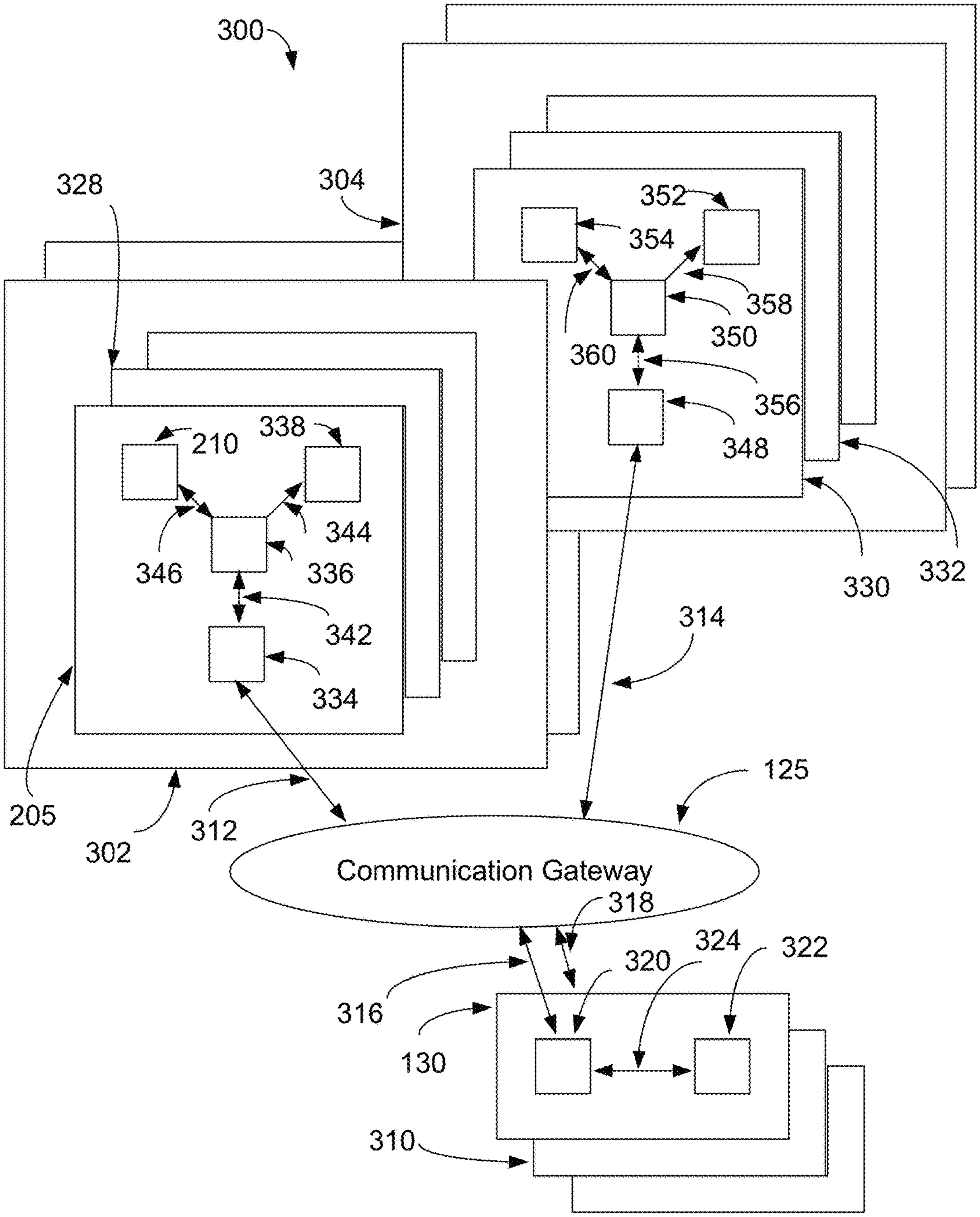
FIG. 3 illustrates an exemplary priority actuation system network architecture, in accordance with an embodiment of the present invention.

FIG. 3 illustrates an exemplary priority actuation system network architecture 300 in accordance with an embodiment of the present invention. In the present embodiment, and with reference to FIG. 2, the exemplary priority actuation system network may include a multiplicity of networked regions with a sampling of regions denoted as a network region 302 and a network region 304, a communication gateway 125 and one or more remote servers with a sampling of remote servers denoted as remote server 130 and remote server 310.

Network region 302 and network region 304 may operate to represent a network contained within a geographical area or region. Non-limiting examples of representations for the geographical areas for the networked regions may include buildings, streets, postal zip codes, telephone area codes, cities, counties, states, and countries. Elements within network region 302 and 304 may operate to communicate with external elements within other networked regions or within elements contained within the same network region.

In some implementations, communication gateway 125 may operate as the Internet. It will be understood by those skilled in the art that the communication gateway may take many different forms. Non-limiting examples of forms for communication gateway 125 may include local area networks (LANs), wide area networks (WANs), wired telephone networks, cellular telephone networks or any other network supporting data communication between respective entities via hardwired or wireless communication networks. The communication gateway may operate to transfer data between the various networked elements.

Remote server 130 and remote server 310 may operate to execute software instructions, store information, support database operations and communicate with other networked elements. Examples of software and scripting languages which may be executed on server 130 and server 310 include but are not limited to C, C++, C#, Java, JavaScript. PHP, Python, Ruby, Erlang, Rails, Perl, and Go Network region 302 may operate to communicate bi-directionally with communication gateway 125 via a communication channel 312. Network region 304 may operate to communicate bi-directionally with communication gateway 125 via a communication channel 314. Remote server device 130 may operate to communicate bi-directionally with communication gateway 125 via a communication channel 316. Remote server 310 may operate to communicate bi-directionally with communication gateway 125 via a communication channel 318. Network region 302 and 304, communication gateway 125, and remote servers 130 and 310 may operate to communicate with each other and with every other networked device located within priority actuation system network architecture 300.

Remote server 130 includes a networking device 320 and a server 322. Networking device 320 may operate to communicate bi-directionally with communication gateway 125 via communication channel 316 and with server 322 via a communication channel 324. Server 322 may operate to execute computer readable instructions and store information.

Network region 302 includes a multiplicity of clients with a sampling denoted as a mobile computing device 205 and an automated access system 328. Mobile computing device 205 includes a networking device 334, a processor 336, a GUI 338 and a user interface 210. Non-limiting examples of devices for GUI 338 include monitors, televisions, cellular telephones, smartphones and PDAs (Personal Digital Assistants). Non-limiting examples of user interface 210 include pointing device, touch screens, keyboards, mouse, trackball, scanner and printer. Networking device 334 may communicate bi-directionally with communication gateway 125 via communication channel 312 and with processor 336 via a communication channel 342. GUI 338 may receive information from processor 336 via a communication channel 344 for presentation to a user for viewing. User interface 210 may operate to send control information to processor 336 and to receive information from processor 336 via a communication channel 346. Network region 304 includes a multiplicity of clients with a sampling denoted as an automated access system 330 and a mobile computing device 332. Automated access system 330 includes a networking device 348, a local processing control unit 350, a GUI 352 and a user interface 354. Non-limiting examples of devices for GUI 338 include monitors, televisions, and led displays. Non-limiting examples of user interface 340 include pointing devices, touch screens, keyboards, mouse, trackballs, intercoms, buttons, and wireless data receiver devices. Networking device 348 may communicate bi-directionally with communication gateway 125 via communication channel 314 and with local processing control unit 350 via a communication channel 356. GUI 352 may receive information from local processing control unit 350 via a communication channel 358 for presentation to a user for viewing. User interface 354 may operate to send control information to local processing control unit 350 and to receive information from local processing control unit 350 via a communication channel 360. In many embodiments, each network region may include one or more mobile computing devices and/or one or more automated access systems. Furthermore, each of the one or more automated access systems may include a local processing control unit, wherein each local processing control unit may include a networking device, a processor, a GUI, a user interface, and one or more local databases. Furthermore, each local processing control unit may be in operable communication with the one or more remote servers and the multiplicity of clients via the communication gateway, wherein an authorized user may control each automated access system via the one or more remote servers.

By way of example, and without limitation, consider a case where a user interfacing with mobile computing device 205 may want to execute a priority actuation software application. A user may enter the IP (Internet Protocol) address for the application using user interface 210. The IP address information may be communicated to processor 336 via communication channel 346. Processor 336 may then communicate the IP address information to networking device 334 via communication channel 342. Networking device 334 may then communicate the IP address information to communication gateway 125 via communication channel 312. Communication gateway 125 may then communicate the IP address information to networking device 320 of remote server 130 via communication channel 316. Networking device 320 may then communicate the IP address information to server 322 via communication channel 324. Server 322 may receive the IP address information and after processing the IP address information may communicate return information to networking device 320 via communication channel 324. Networking device 320 may communicate the return information to communication gateway 125 via communication channel 316. Communication gateway communication 125 may communicate the return information to networking device 334 via communication channel 312. Networking device 334 may communicate the return information to processor 336 via communication channel 342. Processor 336 may communicate the return information to GUI 338 via communication channel 344. User may then view the return information on GUI 338. Also, consider, for example, and without limitation, the case where a user interfacing with mobile computing device 205 may want to actuate an operation of an operably coupled automated access system to be actuated. In some embodiments, mobile computing device 205 may be included in a same network region as the automated access system to be actuated. In some embodiments, mobile computing device 205 may be included in a different network region than the automated access system to be actuated. By way of example, and without limitation, the user may select a unique identifier of the operably coupled automated access system to be actuated and enter a call via a keyboard of the user interface 210, wherein the call may include a password, identify information, and operation information. The unique identifier and call may be communicated to processor 336 via communication channel 346. Processor 336 may then communicate the unique identifier and call to networking device 334 via communication channel 342. Networking device 334 may then communicate the unique identifier and call to communication gateway 125 via communication channel 312. Communication gateway 125 may then communicate the unique identifier and call to networking device 320 of remote server 130 via communication channel 316. Networking device 320 may then communicate the unique identifier and call to server 322 via communication channel 324. Server 322 may receive the unique identifier and call and after processing the unique identifier and call, may communicate return information to networking device 320 via communication channel 324. Networking device 320 may communicate the return information to communication gateway 125 via communication channel 316. Communication gateway 125 may communicate the return information to a processing control unit of the operably coupled automated access system to be actuated based on the unique identifier, wherein a networking device of the processing control unit may receive the return information and communicate the return information to a processor of the local processing control unit for processing and actuation of the operation based on the operation information.

In some embodiments of the present invention, one or more users may actuate one or more operations of one or more automated access systems via one or more priority actuation triggers. In some embodiments, a priority actuation trigger may include a user interface of a mobile computing device operably coupled to a priority actuation system, wherein a user may enter data such as, and without limitation, selecting a priority button, a password button, user identification information, unique identification of one or more automated access systems, a password, and operation information into the mobile computing device, via the user interface for operable communication to the one or more automated access systems. In some other embodiments, a priority actuation trigger may include a hardware priority button and password button configured into a structure of an automated access system, for example, and without limitation, buttons within a user interface of a lift system. The priority actuation trigger may further include a wireless data receiver device included in an automated access system that may be actuated when in close proximity to a wireless data emitter device of a user, wherein the wireless data receiver device may include for example, and without limitation, a RFID receiver device, Bluetooth receiver device, Zigbee receiver device, or the like, and the wireless data emitter may be an RFID identification tag, a mobile device coupled to a networking device and SIM card, or other identification information communication device suitable for the needs of a particular application. In the present embodiment, an automated access system may be operated in response to the user pressing a priority button, and presenting the identification tag in close proximity to the wireless data receiver. Additionally, in some embodiments, the priority actuation trigger may further include a user interface configured into a structure of the automated access system, wherein a password may additionally be entered for verification and potential actuation of the automated access system. In yet some other embodiments, a priority actuation trigger may include one or more biometric sensors, such as, and without limitation, an e-Health sensor, a EKG monitor, a EEG monitor, a respirator, a pacemaker, a fingerprint scanner, retinal scanner, DNA analyzer, wearable devices that may measure physiological functions, a blood pressure monitor, a heartrate monitor, a glucose level monitor or substantially any sensor device which may detect, record, and process physiological data, or any combination thereof, wherein the one or more biometric sensors may be operably coupled to a priority actuation software application. In many embodiments of the present invention, the one or more biometric sensors may trigger a priority button of the priority actuation software application in response to the one or more biometric sensors detecting one or more particular health conditions of a user. Furthermore, the one or more sensors may also be programmed to communicate a password, associated with the user, to the priority actuation software for automated execution of automated access system operations. In one embodiment, a manufacturer of the priority actuation trigger may include a user interface configured into a structure of the automated access system, wherein a link may be created for potential actuation of the automated access system. For example, the manufacturer of any e-health sensor may need to make a link to the lift application i.e., the e-health sensor application passes the priority password to the lift application, wherein both applications may run on the same device, i.e., a user's mobile phone. Accordingly, data from a user selecting a priority button within the lift application i.e., Input=A would be different from a priority button triggering from input sensor data i.e., Input=B. then verify=master key. The master key may be a universal password that is always positively identified and verified for any user of the sensor data trigger. In an alternate embodiment, the lift application may require a user to go through a registration process, wherein a user may be associated with particular sensor data, sensor device identification numbers, and a password so that when the sensor data may be received by the lift application, sensor ID information may be captured and an associated password may be communicated to a particular local processing unit. By way of example, and without limitation, a user using an operably coupled automated access system, such as, and without limitation, a lift, and suffering a health condition may travel directly to a destination floor while bypassing intervening floors, in response to one or more biometric sensors communicating the health conditions and the password to a local processing control unit of the lift via a priority actuation software application. In many embodiments, the one or more sensors may determine an occurrence of a health condition by comparing detected physiological data to a predetermined threshold value. In another example, and without limitation, one or more biometric sensors may wirelessly emit a health condition signal based on the comparing, while the user may be traveling in public and thus the priority actuation system may be utilized outside of a lift. By way of example, and without limitation, one or more operably coupled automated access systems, such as, and without limitation, one or more traffic lights, may receive the emitted health condition signal via one or more local processing units of the one or more traffic lights, and in response, actuate a light changing of the one or more traffic lights to allow the user to bypass some traffic stops while in route to a particular In many embodiments of the present invention, local databases of the local processing control units and databases of the one or more remote servers may store identification information related to registered users, wherein registered users may be authorized to use the priority actuation system after verification of a user identity and password. By way of example, and without limitation, in an exemplary case, local building security staff may be registered in a local database with respect to a single building and city law enforcement staff may be resisted in a remote server database, wherein the local building security staff may utilize one or more automated access system operations within the single building and the city law enforcement staff may utilize one or more automated access system operations in a multiplicity of locations throughout the city.

In some embodiments of the present invention, the priority service may have triggered between the lift device of the passenger/user and the local control unit, without the need to contact remote server hence providing a faster processing. In certain other embodiments, each time a new priority user is added to the remote server, the information of that user is automatically dispatched to all local databases of all lifts connected to the remote server so that the new user is known in all local places. Such automatic dispatch of any newly added user from remote server to the local database may have the following advantages. One advantage of automatic dispatch of user information to local databases of lifts is that the connection between local lift and remote server if broken for any reason the priority feature will work since the database is already updated with latest users even with any registered user not belonging to that local building (i.e. a policeman coming from another city). Typically the local database is only built by the residents of the building in addition to local security building security staff. For any additional user, user information will be sent from local database to remote server to check whether these users are priority authorized users. However, if user information is automatically dispatched to local databases of lifts, then since the local database is always automatically updated by the remote server no individual request is sent from local database to remote server and a lot of signaling and processing (depending on the number of non-resident priority users visiting that building) may be reduced. Moreover, there may be no delay in the priority service as the decision of priority service is taken locally (by the local control unit). For example, a city policeman will have his priority information registered first on the remote server which is then automatically dispatched to the local database of all lifts in that city so that the policeman could have priority access on all those lifts.

Figure 4:
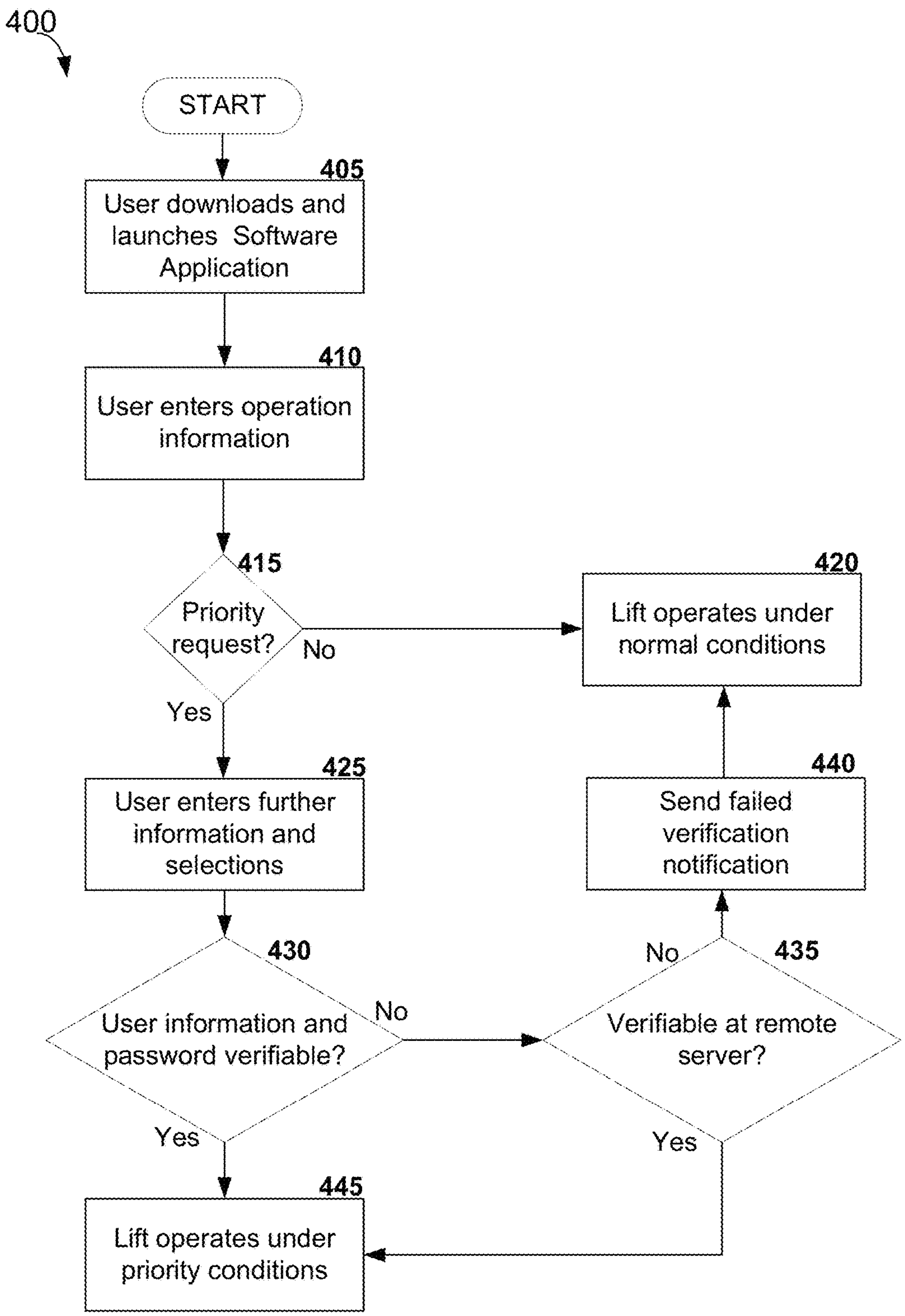
FIG. 4 illustrates an exemplary process of using a priority actuation system, in accordance with an embodiment of the present invention.

FIG. 4 illustrates an exemplary process 400 of using a priority actuation system, in accordance with an embodiment of the present invention. In the present exemplary embodiment, by way of example, and without limitation, a user may operate an automated access system such as, and without limitation, a lift system. In a step 405, a user may download a priority actuation software application to a mobile computing device and may launch the priority actuation software application. Next, in a step 410, the user may enter operation information via user interface 210 provided by the priority actuation software application, wherein the operation information may be a destination floor. In some alternative embodiments, operation information may include a light color to be switched to, a direction of travel, an open command, a close command, and/or other instructions suitable for the needs of a particular application such as, and without limitation, operating a traffic light, operating an escalator or moving walkway, and/or operating a controlled access door or turnstile. In the present embodiment, the operation information may be communicated to a local processing control unit of the lift. In a decision step 415, the user may choose operate the lift under priority conditions or normal conditions by choosing to press a priority button or not pressing the priority button. In some embodiments, a priority button may be displayed and selectable on user interface 210 and/or the priority button may be a selectable hardware button within a user interface of the lift. In a case that the user may not select a priority button, the lift may operate under normal conditions in a step 420, wherein normal conditions may include the lift stopping at any intervening floors if other passengers and/or potential passengers may have made any destination and/or call requests for the intervening floors. In a case that the user may select a priority button, the user may further select a password button, enter user identity information and a password in a step 425. In some embodiments, the user identity information, selection of the password button and/or the password may be entered via user interface 210 and/or entered via a user interface of the lift. The user's selections, entered identity information and password may then be communicated to the local processing control unit of the lift. In some embodiments, the user identity information may be communicated to the local processing control unit via a wireless data emitter device such as, and without limitation a user RFID identification tag. In a decision step 430, the local processing control unit may process the operation information, the entered user identity information, and the entered password to actuate the lift to proceed to the destination floor or reject the priority request based on verification of the password with respect to the identity information. In a case that the password and identity information is not verified, the local processing control unit may communicate the password and identity information to one or more remote servers for another verification process, in a step 435, wherein if the password and identity information is still not verified, the local processing control unit may then send a notification of failed verification, in step 440, to predesignated authorized users, such as, and without limitation security staff, an owner of a building, a CEO, or other authorized users of the lift, moreover the local processing control unit may also actuate the lift to operate under normal conditions. In a case that the password and identity information is verified by the local processing control unit or the one or more remote servers, the local processing control unit may then actuate the lift to operate under priority conditions in a step 445, wherein priority conditions may include the lift bypassing intervening floors if other passengers and/or potential passengers may have made any destination and/or call request for any of the intervening floors. In some embodiments, an automated access system operating under priority conditions may display an indication inside and/or outside of the automated access system that a priority operation has been actuated, wherein the display may be via a user interface of the automated access system. In some embodiments, a user may press a priority button and be verified for use without selecting a destination floor, in this case, the processing control unit of the lift may actuate the lift to move to a predetermined floor. In some other embodiments a password may be mandatory only when a priority button may be triggered. In yet some other embodiments, use of a wireless data emitter device such as, and without limitation, a user RFID identification tag, may allow actuation of one or more automated access systems operations without a password being entered.

In some embodiments of the present invention, a priority button may be optional for actuation of the priority actuation system. In the present embodiment a remote authorized user may remotely actuate one or more automated access system operations. For example, and without limitation, with reference to FIG. 4, a passenger of the lift may not be an authorized user of the prior actuation system. In a case that the passenger may call authorized security staff and/or other authorized users for assistance and/or any other concerns suitable for the needs of a particular application, the authorized security staff and/or other authorized users may remotely actuate the lift, via a priority actuation software application, to operate under priority conditions for the passenger to a destination floor, wherein the call may include the passenger communicating an origin floor and destination floor via a telephone or intercom device of the lift, for the authorized security staff and/or other authorized user to operate the lift accordingly.

Figure 5:
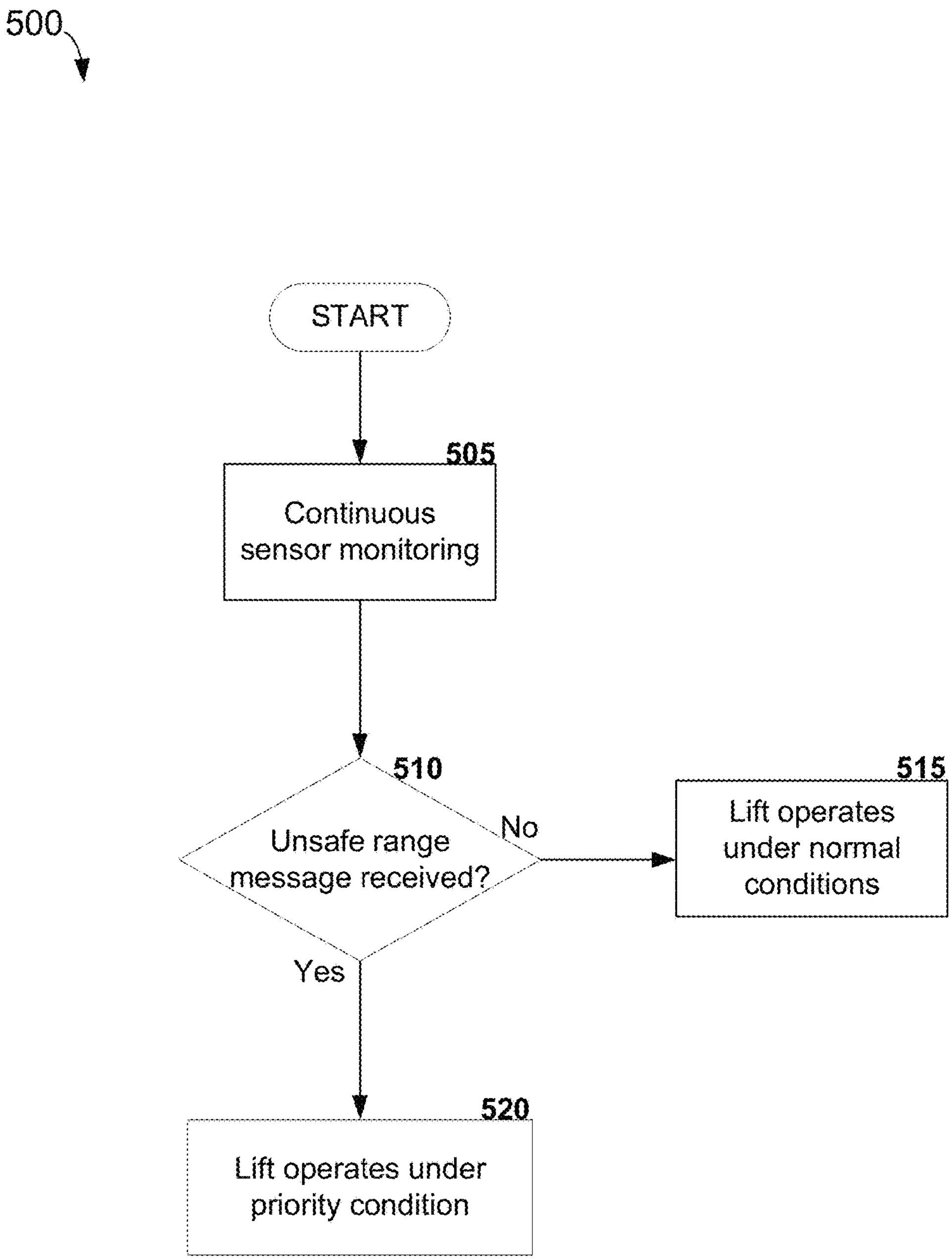
FIG. 5 illustrates another exemplary process of using a priority actuation system, in accordance with an embodiment of the present invention.

In some embodiments of the present invention, a priority actuation trigger may be triggered without voluntary user intervention. FIG. 5 illustrates another exemplary process 500 of using a priority actuation system, in accordance with an embodiment of the present invention. In the present embodiment, an authorized user of a priority actuation system may be continuously or periodically monitored by one or more biometric sensors in a step 505, wherein monitoring the authorized user may include the one or more biometric sensors recording and/or detecting health data related to the authorized user. In many embodiments of the present invention, health data may include for example, and without limitation, a heart rate, brain activity, blood pressure, respiration, body temperature, muscle movement, a glucose level, blood oxygen levels, or substantially any other measurable physiological functions of a human body, or any combination thereof. In the present embodiment, the one or more biometric sensors may also continuously compare the recorded and/or detected health data to one or more preprogrammed threshold values, wherein the one or more biometric sensors may determine if the recorded and/or detected health data may be in a safe or unsafe range with respect to the one or more preprogrammed threshold values. Those skilled in the relevant art, in light of and in accordance with the teachings of the present invention would readily recognize that particular values of a safe and/or unsafe range would depend on the needs suitable for a particular application, such as, a type of physiological function being monitored. In a decision step 510, one or more local processing control units may receive a message from the one or more biometric sensors indicating a safe or unsafe range of recorded and/or detected health data, wherein by way of example, and without limitation, at least one of the one or more local processing control units may be operably coupled to an automated access system such as, and without limitation, a lift system. In a case that the received message may indicate that the recorded and/or detected health data may be in a safe range with respect to the one or more preprogrammed threshold values, the at least one local processing control unit may continue to actuate the lift system to operate under normal conditions in a step 515. In a case that the received message may indicate that the recorded and/or detected health data may be in an unsafe range with respect to the one or more preprogrammed threshold values, the at least one local processing unit may actuate the lift system to operate under priority conditions in a step 520, and a password may be bypassed. In the present embodiment the user may designate a floor to be traveled to or the local processing control unit may actuate the lift system to travel to a predetermined designated floor.

In certain embodiments, the user requiring the priority clearance, such as for example a policeman chasing a criminal and needing to get priority passage at a traffic light in his chase path, etc. . . i.e., a user in motion. It may be appreciated by a person with ordinary skill in the art, in light of and in accordance with the teachings of the present invention, that to enter the priority password manually especially that such password might be a long sequence of alpha numerical digits in such situations may not be a feasible option. Accordingly, in one embodiment is provided an authorized identity card. In one exemplary embodiment, when the priority actuation system is being used for triggering actions in a lift, the authorized identity card may include an authorized lift identity card. The authorized lift identity card may include a feature that makes it possible to trigger the priority service. For example, certain lifts in a company or a hotel may have swipe card machines. These lifts may only allow passengers with authorized swipe cards to use lifts to reach the floors of their company or hotel room respectively. Accordingly, a user who possess an authorized lift identity card may be enabled to reach any floor along with a priority service that may assist in bypassing all intermediate floors. In certain embodiments, the swipe device may be placed in plain sight of the user(s). In some embodiments, the swipe device or any device that provides a similar priority actuation trigger as the swipe device may be hidden, i.e., behind the wall of the lift, to prevent accidental or intentional damage to the device. The hidden device may be connected to the lift local processing unit, either wired or wireless connection. The hidden device may work in a manner similar to the swipe device but with an increased range/sensitivity to be able to read the authorized lift identity card from a predefined minimum distance.

In another example, the authorized lift identity card may be used by prioritized passengers who frequently use the lift, i.e., a CEO of a company may not have to enter the password manually each time he/she would choose to use the priority service. In another example, a policeman approaching a traffic light may use the authorized lift identity card in conjunction with a device placed in his car that may be operably coupled via wireless to communicate with the local traffic light via local control unit implemented in the traffic light or via a remote server which could give orders to the local traffic light, without the policeman having to manually entering a password. In certain embodiments, the authorized identity card may automatically provide access to a user whenever the user is in proximity to a local control unit that is operably coupled to the authorized identity card. In certain other embodiments, the authorized identity card may include an additional trigger, for example, a button embedded on the authorized identity card, that will enable the user to activate the card in proximity to a local control unit which then will trigger the priority device. In another embodiment the holder of the authorized identity card approaches a lift or a traffic light without being in emergency situation. For example, if a policeman is off-duty and trying to pass a traffic signal, or if the policeman is visiting a friend in a building, etc. . . . In such situations, normal service may be used. The emergency service may be used only when the additional trigger is pushed explicitly by the card holder.

It may be appreciated by a person with ordinary skill in the art, in light of and in accordance with the teachings of the present invention, that the embedded button may work as follows: Each time the holder of the authorized identity card presses the button, a 'priority request' message may have sent from the card to device placed in proximity to the user, for example, in a car driven by the user, in a mobile phone of the user, in a carrier on the user's person, etc. . . . In various embodiments, the technology being used between operably coupling the authorized identity card with the device in proximity, i.e., technology including but not limited to, Bluetooth or RFID or Zigbee or others, the 'priority request' message, containing a username, a password, and a priority service request, may be sent via an application, denoted 'button application' and embedded in the authorized identity card, which sends its data like any other application embedded over a Bluetooth or RFID or any other type of wireless device. At the receiver side, the 'priority request' message is translated via similar 'button application' installed on the device in proximity, and the device in proximity may forward that 'priority request' message to the local control unit where authentication and password verification are carried out before giving priority authorization. If the user is authorized then the user may be notified by various means, including but not limited to, an LED (light emitting diode) on the authorized identity card that changes to a particular color say green for access granted, an SMS (Short Message Service) sent to the user's mobile device, etc. . . . The notification ensures the priority access to the user, i.e., reaching a destination floor by bypassing any intermediate floors in a lift, getting traffic clearance at a signal in the user's path, etc. . . . However, in embodiments where the 'priority request' is not acknowledged, the card holder may be notified about the possible reason of failures via an SMS or via any other means known to one skilled in the art, in accordance with embodiments of this invention.

In various embodiments, a singular authorized identity card may be employed to send priority request to many devices. It may be appreciated by a person with ordinary skill in the art, in light of and in accordance with the teachings of the present invention, that each electronic device may have a unique identifier. For example, if Bluetooth is used as a wireless technology between the authorized identity card and the device in proximity, each Bluetooth enabled device is identified by a name i.e., a default name from the manufacturer and/or by a unique address which may be of 48 bit length where the first 24 bits may represent the manufacturer called Organization Unique Identifier (OUI), and the remaining 24 bits may be used to give each device a unique address.

In certain uses of the authorized identity cards it may not be practically feasible to have the address of every required device in proximity, for example, device in proximity in each of a multiplicity of lifts in the authorized identity cards. In such an event, in one embodiment, if address of the multiplicity devices in proximity may include one common, Bluetooth address, or a certain range of addresses, is set for all the required devices in proximity. In another embodiment, if the name identification procedure is used, then a common name is given to all required devices in proximity which may be possible because the user enabled to change the name of any Bluetooth device. Accordingly, only the common name or the common address of the device in proximity is stored on the authorized identity card. All the other Bluetooth device including but not limited to, a mobile phone headset or a smart lamp in the hall, etc. . . may have a different Bluetooth name or address, thus eliminating the confusing between calling the lift or calling the mobile headset or the smart lamp as the application of the lift will communicate only with the common name or address entered for the device in proximity of the lift.

In various embodiments, in order for the lift local control unit to know from which floor the priority call request was triggered, different procedures may be used depending on the type of priority service trigger method used, including but not limited to biomedical sensor, authorized identity card, etc. . . . In one embodiment, if the authorized identity card method is used a hidden device (device in proximity) is implemented on each floor. This device may have an address or a name that reflects the floor number, for example, a hidden device on the fifth floor has a name 'fifth floor'. When the hidden device receives a priority request from the authorized identity card holder, the device sends a 'priority request' message to the local control unit. In addition to all the contents of the 'priority request' mentioned above (username and priority request) the device adds the actual floor number from where the call is made, for example, 'fifth floor'. In response to this priority request the local lift control unit may send the closest lift, i.e., a lift currently in the 20th floor, to the fifth floor in a priority service. As a consequence, there may be no or minimized delay in waiting for the lift to arrive which may be beneficial in any emergency situations.

In another embodiment, only one hidden device may be installed in the building and moves with the lift. An additional passive device may be installed on each floor. The function of the passive device may be to instruct the authorized identity card about the actual number of the floor from where the priority service is triggered. When the user pushes the priority button on the authorized identity card, the authorized identity card first communicates with the passive device in order to know the number of the actual floor. This communication may be achieved using any wireless technology i.e., Bluetooth or RFID or Zigbee or others and the name of the floor could be identified from the address or name of the passive device. The authorized identity card sends a 'priority request' with contents as described above to the hidden device and in addition it sends the newly acquired actual floor number. The hidden device forwards this information to the lift local control unit and the local control unit then directs the closest lift to the actual floor in a priority service bypassing all intermediate floors.

In an embodiment, where the lift mobile application method is used, then in one embodiment, in addition to entering the target floor destination, the actual floor number from where the request is made is also entered by the user, for example, fifth floor. Once the lift local control unit receives the information, and after the verification and authorization is completed, as described hereinabove, the local lift control unit directs the closest lift to the actual floor in a priority manner that is by bypassing all intermediate floors. In another method instead of entering actual floor number, the mobile phone could communicate via Bluetooth or RFID or any other technology to a passive device installed in each floor, and the lift application takes that new input and sends it together with target floor address, username and password of the user.

Those skilled in the relevant art in light of and in accordance with the teachings of the present invention would readily recognize that one or more users of the priority actuation system as described above may be authorized for use with respect to one or more particular automated access systems within one or more particular regions. Moreover, one or more other users of the priority actuation system as described above may be authorized for use with respect to a same one or more particular automated access systems within a same one or more particular regions and/or one or more other particular automated access systems within one or more other particular regions. In various embodiments, different procedures may be employed for registration depending on the type of priority service being used.

In one exemplary embodiment, when the authorized identity card is being used by a user, in addition to the priority service request the 'priority request' message, described hereinabove the authorized identity card will carry a 'username'. In various embodiments, the 'username' could be represented by the identity of the authorized identity card, including but not limited to, a manufacturer unique tag or unique address or by a range of addresses or tags. In alternate embodiment, the identity of the authorized identity card may also be represented by a stored 'username' on the authorized identity card, for example, a common username for all card holders belonging to the same authority. In yet another alternate embodiment, the identity of the authorized identity card may could also be a combination of both common stored 'username' and manufacturer unique or range of address/tag. Once the hidden device receives the 'priority request' message the hidden device forwards the message to the lift local control unit where the received 'username' is compared to all authorized identities stored on the local lift database. If received 'username' matches any of the stored authorized 'username', the local control unit proceeds with providing the priority service. Alternatively, if the username does not match, then the request is rejected and the card holder will have to use the lift in normal service. In one embodiment, the distributor of new authorized identity card, for example, a police administration, registers the 'username' of each new card together with the identity of the card holder i.e., first name, family name, date of birth, telephone number, home address etc. . . on the remote server. This could be done and controlled by an authorized entity i.e., national security staff. Then the remote server dispatches each new authorized identity card identity to all local lifts in the country.

In an exemplary embodiment, when the lift mobile application is used, then each time an authorized user downloads the lift application from the remote server, it registers the authorized user's identity on the remote server by entering his identity, i.e., first and last name, date of birth, telephone number, home address etc. . . and assigns a 'username' and a 'password'. In one embodiment, the 'username' could be the user's email address or any word with an alpha numerical combination. The user's 'password' may also include a word with any alpha numerical combinations. Each time a new user is defined on the remote server, the user data is dispatched to the local control units of all local lifts. Later when a user triggers the priority service by pressing the priority button on the lift application, a request that contains the 'username' & 'password', defined during the registration, is sent via a wireless communication from the mobile phone where the application is implemented to the local control unit of the lift. If received 'username' & 'password' matches any of the stored authorized 'username' & 'password', the local control unit proceeds with providing the priority service. Alternatively, if the 'username' & 'password' does not match, then the request is rejected and the user will have to use the lift in normal service.

In an exemplary embodiment, when the biological sensor is used for verification, there may be no need to have a username verification. Any user i.e., a passenger carrying the biological sensor may be allowed the priority service once the output of that sensor exceeds a defined threshold. For a biological sensor a hidden password, unknown and transparent to the biological sensor holder and represented by a master key as described herein above may be employed. The hidden password may be communicated to the local control unit in the local lift or local traffic light in a similar manner as the authorized identity card communicates with the hidden device or in a manner known to one skilled in the art in accordance with embodiments of this invention.

In an exemplary embodiment, where a remote priority service is triggered on behalf of the lift passenger who might have had an accident, the procedure of authentication may be transparent to the passenger. Typically, it is done by the security staff who may have remote access to the local lift priority system.

By way of example, and without limitation, it is contemplated that high level executive staff in substantially any building may benefit from utilization of the priority actuation system. Consider a case where a CEO of a company may have a single private lift within company premises, wherein the company premises may include a multiplicity of lifts. In light of and in accordance with the teachings of the present invention, the CEO may be provided with a dedicated password, wherein the dedicated password may allow the CEO to use any of the multiplicity of lifts under priority conditions. That priority feature may be triggered as described above, wherein a lift in use by the CEO may display a message via the lift user interface, such as, and without limitation, 'CEO in the lift'. By way of further example and without limitation, the CEO password may work only in a specific building where the company is located, whereas, for example and without limitation, a security staff password may work in a multiplicity of buildings including the specific building there the company is located.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation:

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a priority actuation system and priority action triggers according to the present invention will be apparent to those skilled in the art. Various aspects of the invention have been described above by way of illustration, and the specific embodiments disclosed are not intended to limit the invention to the particular forms disclosed. The particular implementation of the priority actuation system and priority action triggers may vary depending upon the particular context or application. By way of example, and not limitation, the priority actuation system and priority action triggers described in the foregoing were principally directed to actuation an operation override of particular systems in response to a user's selection, wherein the particular systems may include for example, and with implementations, lifts, traffic lights, controlled access doors, controlled access turnstiles, moving walkways, escalators, and the like; however, similar techniques may instead be applied to electronic devices such as television, radios, appliances and computers as well as electronically enabled vehicles and other automated systems, wherein a controlling software application may be modified with respect to operations of the devices, vehicles, and systems, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method for priority actuation, comprising:

providing a priority button for at least one automated access system, wherein an access to the priority button is provided to an authorized user, wherein the authorized user is enabled to initiate a priority actuation trigger for a priority service in said at least one automated access system using said priority button;

operably connecting said at least one automated access system to at least one server via a communication gateway, wherein said server comprises a database of the authorized users enabled to access said priority service and the identity of said automated system;

triggering of said priority button resulting in initiating the priority actuation trigger for sending an authentication information of the authorized user to said server;

authenticating the user as the authorized user enabled to access said priority service; and providing the user with said priority service for said at least one automated access system, wherein said automated access system is configured to be operable for automatically activating a non-authorized user request for using said priority service based on a sensor, wherein when a threshold is exceeded, an embedded priority username and password is automatically provided by said sensor without user intervention, to gain authorized use of said automated access system.

2. The method of claim 1, wherein the priority button for providing the priority actuation trigger comprises: a hardware provided in the at least one automated access system; a user interface of a mobile computing device operably coupled to a priority actuation system, wherein the mobile computing device comprises at least one of, a mobile phone, a hand held device, and an identity card; a wireless data receiver device included in an automated access system that is actuated when in close proximity to a wireless data emitter device of a user; a user interface configured into a structure of the at least one automated access system, wherein additionally a password is entered for verification and potential actuation of the at least one automated access system; and a biometric sensor operably coupled to a priority actuation system.

3. The method of claim 1, wherein the server is a remote server operably coupled with the at least one automated access system via the communication gateway.

4. The method of claim 1, wherein the server is a local server operably coupled with the at least one automated access system via the communication gateway, wherein said local server and said remote server are generally synchronized, such that an entry on the remote server is dispatched to substantially all local servers and similarly an entry on one local server is transferred to the remote for dispatching to all other local servers whenever the authentication of a user on the local server is not verified.

5. The method of claim 1, wherein the authentication information comprises an identity and a password of the authorized user which are associated with the identity of the automated system.

6. The method of claim 5, wherein the identity comprises a mobile phone SIM card, a hardware identity of a mobile phone, an identity card of the user, or a tag of a user application, and wherein the password is entered manually by the user or is filled automatically without user intervention.

7. The method of claim 1, wherein the automated access system is assigned a unique identity and comprises at least one of a lift, an elevator, a dumbwaiter, a service elevator, a traffic light, an escalator, a moving walkway, a controlled access turnstile, a controlled access door, or any combination thereof, wherein the automated access system is in operable communication with at least one server to receive and/or send executable computer readable operation instructions.

8. The method of claim 6, wherein the operation instructions comprise: a light color to be switched to, a direction of travel, an open command, a close command, and the like instructions suitable for the needs of the automated access system such as, and without limitation, operating a traffic light, operating the escalator, the moving walkway, the elevator, the lift; and/or operating a controlled access door or turnstile and the like.

9. The method of claim 7, wherein if the automated access system is a lift, each time the priority service is triggered from any actual floor X, towards a destination floor Y, not only the lift goes from floor X to floor Y bypassing any intermediate floors, but also at the time of the priority call the lift goes from the closest position of the lift, floor W, to that floor X in a priority service bypassing all intermediate floors from floor W to floor X.

10. A system for priority actuation, comprising:

means for providing a priority button, wherein an access to the priority button is provided to an authorized user, wherein the authorized user is enabled to initiate a priority actuation trigger for a priority service in the at least one automated access system using the priority button;

means for operably connecting at least one automated access system to at least one server, wherein the means comprises a communication gateway, wherein the at least one server comprises a database of all authorized users of a priority service, which comprises the associated identity of said automated system;

wherein triggering the priority button results in initiating the priority actuation trigger for sending an authentication information of the authorized user to the server;

wherein the server authenticates the user as the authorized user enabled to access the priority service; and provides the user with the priority service for the at least one automated access system;

wherein said automated access system is configured to be operable for automatically activating a non-authorized user request for using the priority service based on a sensor, wherein when a threshold is exceeded, an embedded priority username and password is automatically provided by said sensor without user intervention, to gain authorized use of said automated access system; and wherein the sensor is a e-health sensor.

11. The system of claim 10, wherein the priority button for providing the priority actuation trigger comprises: a hardware provided in the at least one automated access system; a user interface of a mobile computing device operably coupled to a priority actuation system, wherein the mobile computing device comprises at least one of, a mobile phone, a hand held device, and an identity card; a wireless data receiver device included in an automated access system that is actuated when in close proximity to a wireless data emitter device of a user; a user interface configured into a structure of the at least one automated access system, wherein additionally a password is entered for verification and potential actuation of the at least one automated access system; and a biometric sensor operably coupled to a priority actuation system.

12. The system of claim 10, wherein the server is a remote server operably coupled with the at least one automated access system via the communication gateway.

13. The system of claim 10, wherein the server is a local server operably coupled with the at least one automated access system via the communication gateway, wherein said local server and said remote server are generally synchronized, such that an entry on the remote server is dispatched to substantially all local servers and similarly an entry on one local server is transferred to the remote for dispatching to all other local servers whenever the authentication of a user on the local server is not verified.

14. The system of claim 10, wherein the authentication information comprises an identity and a password of the authorized user to be associated with the identity of the automated system.

15. The system of claim 14, wherein the identity comprises a mobile phone SIM card, a hardware identity of a mobile phone, an identity card of the user, or a tag of a user application, and wherein the password is entered manually by the user or is filled automatically without user intervention.

16. The system of claim 10, wherein the automated access system comprises at least one of a lift, an elevator, a dumbwaiter, a service elevator, a traffic light, an escalator, a moving walkway, a controlled access turnstile, a controlled access door, or any combination thereof, wherein the automated access system is in operable communication with at least one server to receive and/or send executable computer readable operation instructions.

17. The system of claim 16, wherein the operation instructions comprise: a light color to be switched to, a direction of travel, an open command, a close command, and the like instructions suitable for the needs of the automated access system such as, and without limitation, operating a traffic light, operating the escalator, the moving walkway, the elevator, the lift; and/or operating a controlled access door or turnstile and the like.

18. A non-transitory computer-readable storage medium with an executable program stored thereon, wherein the program instructs one or more processors to perform the following steps:

providing a priority button for at least one automated access system, wherein an access to the priority button is provided to an authorized user, wherein the authorized user is enabled to initiate a priority actuation trigger for a priority service in the at least one automated access system using the priority button;

operably connecting the at least one automated access system to at least one server via a communication gateway, wherein the server comprises a database of the authorized users enabled to access the priority service and of the identity of that automated system;

triggering of the priority button resulting in initiating the priority actuation trigger for sending an authentication information of the authorized user to the server;

authenticating the user as the authorized user enabled to access the priority service; and providing the user with said priority service for said at least one automated access system, wherein said automated access system is configured to be operable for automatically activating a non-authorized user request for using said priority service based on a sensor, wherein when a threshold is exceeded, an embedded priority username and password is automatically provided by said sensor without user intervention, to gain authorized use of said automated access system.

* * * * *